United States Patent
Lee

(10) Patent No.: US 7,423,389 B2
(45) Date of Patent: Sep. 9, 2008

(54) LED DRIVING DEVICE OF OVERVOLTAGE PROTECTION AND DUTY CONTROL

(75) Inventor: Sang Yun Lee, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 11/785,953

(22) Filed: Apr. 23, 2007

(65) Prior Publication Data

US 2007/0247450 A1    Oct. 25, 2007

(30) Foreign Application Priority Data

Apr. 24, 2006    (KR) .................. 10-2006-0036900

(51) Int. Cl.
H05B 37/02    (2006.01)
H02H 3/20    (2006.01)

(52) U.S. Cl. .................. 315/308; 315/209 R; 315/250; 361/86; 361/91.1

(58) Field of Classification Search ............. 315/209 R, 315/210, 246, 250, 291, 307, 308; 361/78, 361/79, 86, 87, 90, 91.1
See application file for complete search history.

(56) References Cited

U.S. PATENT DOCUMENTS

| | | | | |
|---|---|---|---|---|
| 6,023,178 | A * | 2/2000 | Shioya et al. | 327/176 |
| 6,211,623 | B1 * | 4/2001 | Wilhelm et al. | 315/224 |
| 6,657,399 | B2 * | 12/2003 | Adams et al. | 315/224 |
| 7,061,215 | B2 * | 6/2006 | Harris | 323/268 |
| 7,262,588 | B2 * | 8/2007 | Matsuo et al. | 323/282 |
| 7,319,311 | B2 * | 1/2008 | Nishida | 323/284 |
| 7,369,384 | B2 * | 5/2008 | Inaba | 361/91.1 |
| 2005/0047031 | A1 * | 3/2005 | Natio | 361/18 |
| 2007/0216387 | A1 * | 9/2007 | Matsuo et al. | 323/282 |
| 2008/0074096 | A1 * | 3/2008 | Nishida | 323/284 |

* cited by examiner

*Primary Examiner*—Thuy Vinh Tran
(74) *Attorney, Agent, or Firm*—McDermott Will & Emery LLP

(57) ABSTRACT

An LED driving device comprises a PWM IC including an RT/CT terminal operated by a power voltage and generating and outputting a sawtooth wave voltage of a predetermined frequency, a COMP terminal to which a comparison voltage compared with the sawtooth wave voltage is inputted, and an output terminal generating and outputting a pulse signal turned off in a section in which a level of the sawtooth wave voltage is higher than a level of the comparison voltage and turned on in a section in which the level of the sawtooth voltage is lower than the level of the comparison voltage. The LED driving device sets up the comparison voltage inputted to the COMP terminal of the PWM IC to be 0 when an error voltage corresponding to a difference between a both end voltage of an LED array and a predetermined reference voltage is less than a predetermined level.

4 Claims, 4 Drawing Sheets

US 7,423,389 B2

LED DRIVING DEVICE OF OVERVOLTAGE PROTECTION AND DUTY CONTROL

CLAIM OF PRIORITY

This application claims the benefit of Korean Patent Application No. 2006-36900 filed on Apr. 24, 2006, in the Korean Intellectual Property Office, the disclosure of which is incorporated herein by reference.

BACKGROUND OF THE INVENTION

1. Field of the Invention

The present invention relates to an LED driving device, and more particularly, to an LED driving device employing a boost type direct current (DC)-DC converter, capable of protecting an LED and a driving circuit from an overvoltage loaded on the LED and controlling a duty of an output signal of a current-mode pulse with modulation (PWM) driving IC employed by the boost type DC-DC converter to be perfect 0%.

2. Description of the Related Art

In general, since a cold cathode fluorescent lamp (CCFL) used for a light source of a backlight of a liquid crystal display (LCD) uses mercury gas, environmental pollution may be caused, response speed is low, color reproduction characteristics is low, and it is difficult to reduce weight, thickness, and size of an LCD panel.

On the other hand, light emitting diodes (LEDs) are environmental, have a high response speed of several nano seconds, are effective on a video signal stream, can be impulsively driven, have color reproduction characteristics of 100%, whose brightness and color temperature can be freely changed by controlling the amount of light of red, green, and blue LEDs, and have advantages on the reducing weight, thickness, and size of an LCD panel. Therefore, currently, LEDs are positively employed for a light source of a backlight of an LCD panel.

When a plurality of LEDs is connected in series to be used in an LCD backlight employing LEDs, a driving circuit capable of supplying a static current to the LEDs and a dimming circuit for controlling brightness of LEDs to freely control the brightness and color temperature or compensate temperature. FIG. 1 illustrates a conventional LED driving circuit.

FIG. 1 is a circuit diagram illustrating a conventional LED driving circuit 10 employing a general boost type DC-DC converter. Referring to FIG. 1, in the LED driving circuit 10 employing the DC-DC converter, an inductor L and a diode D are connected to a + terminal of a DC power Vin in series and a capacitor C and an LED array 11 are mutually connected in parallel between the diode D and a − terminal of the DC power Vin. A switch 12 and a voltage detection resistor Rs are connected in series between the inductor L, a connection node of the diode D, and the − terminal of the DC power Vin. A voltage value detected by the voltage detection resistor Rs is inputted to a PWM driving portion 13. The PWM driving portion 13 controls a duty ratio of turning on-off of the switch 12, depending on the detected voltage value. A MOSFET may be used for the switch 12 by controlling a gate voltage of the MOSFET, as shown in FIG. 1.

When the switch 12 is turned on, a voltage applied to the DC power Vin flows into the inductor L and the switch 12 and energy is accumulated in the inductor L. When the switch 12 is turned off, a total amount of the DC power Vin and the energy accumulated in the inductor L passes the diode D and is applied to the LED array 11. In this case, a voltage applied to the LED array 11 is smoothed by a smoothing capacitor C and a value of the voltage is not less than an input voltage Vin.

In the conventional LED driving circuit 10 employing the boost type DC-DC converter, brightness of the LED array 11 is controlled by controlling the voltage value detected by the voltage detection resistor Rs by controlling a resistor value of the voltage detection resistor Rs. Though the brightness can be controlled by using a variable resistor for a voltage detection resistor Rs, since a wattage resistor has to be used as the voltage detection resistor Rs due to a high Led resistance, variableness is difficult. Also, when a plurality of LEDs emitting light of various colors is used, a different driving circuit for each color of LEDs is used. Since a variation occurs in a value of the voltage detection resistor Rs for each driving circuit, controlling brightness, color coordinates, and uniformity is difficult.

Also, in the LED driving circuit 10 employing the boost type DC-DC converter, when a load, namely, the LED array 11 is open or a voltage of the inductor L instantly increases more than the load, an overvoltage may be applied to the load and the LED driving circuit 10 employing the boost type DC-DC converter and the LED array 11 may be damaged. Accordingly, an overvoltage protection circuit is essentially in the LED driving circuit 10 employing the boost type DC-DC converter.

Also, a static current type pulse current is used for a driving power supplied to from the LED driving circuit 10 employing the boost type DC-DC converter to the LED array 11, and a PWM control method of controlling a duty of the pulse current is applied to control the brightness and color of the LED array 11. Namely, the PWM driving portion 13 is used for control an on-off duty of the switch 12 via PWM control. Generally, a current-mode PWM driving IC is used as the PWM driving portion 13. However, in the LED driving circuit 10 employing the boost type DC-DC converter, since a duty of an output signal does not perfectly become 0% due to characteristics of the current-mode PWM driving IC, LEDs are slightly lighted when to turn off LEDs.

SUMMARY OF THE INVENTION

An aspect of the present invention provides an LED driving device, having functions of overvoltage protection and duty control, capable of protecting a load and a driving circuit from an overvoltage applied to the load and controlling a duty of an output signal of a current-mode PWM driving IC to be perfect 0%.

According to an aspect of the present invention, there is provided an LED driving device including: an LED array comprising a plurality of LEDs electrically connected to each other; a PWM IC comprising an RT/CT terminal operated by a power voltage and generating and outputting a sawtooth wave voltage of a predetermined frequency, a COMP terminal to which a comparison voltage compared with the sawtooth wave voltage is inputted, and an output terminal generating and outputting a pulse signal turned off in a section in which a level of the sawtooth wave voltage is higher than a level of the comparison voltage and turned on in a section in which the level of the sawtooth voltage is lower than the level of the comparison voltage; a switching portion switching and providing an inputted DC voltage to the LED array as a driving voltage, according to the pulse signal outputted from the PWM IC; a voltage detector generating a detection voltage corresponding to a both end voltage of the LED array; a voltage comparator comparing the detection voltage with a predetermined reference voltage and outputting a first error voltage corresponding to a difference between the detection voltage and the reference voltage; and a comparison voltage setting portion setting up the comparison voltage inputted to the COMP terminal of the PWM IC to be 0 when the error voltage is less than a predetermined level.

The voltage comparator may include a first OP amplifier receiving the detection voltage via an inverting input terminal, receiving the reference voltage via a non-inverting input terminal, and outputting the first error voltage corresponding to the difference between the inverting input terminal and the non-inverting input terminal.

The comparison voltage setting portion may include: a first diode whose cathode is connected to an output terminal of the first OP amplifier; a resistor whose one terminal is connected to the power voltage and another terminal is connected to an anode of the first diode; a second OP amplifier, whose non-inverting input terminal is connected to the anode of the first diode and electrically connected to an output terminal, having an output whose level is identical with an input voltage of the non-inverting input terminal; and a PNP transistor whose base is connected to the output terminal of the second OP amplifier, emitter is connected to the COMP terminal of the PWM IC, and collector is connected to a ground.

The LED driving device may further include a third OP amplifier receiving a voltage whose level corresponds to one of a linear dimming signal and a PWM dimming signal inputted from outside, via a non-inverting input terminal, receiving a voltage whose level corresponds to a current outputted from a cathode terminal of the LED array via an inverting input terminal, comparing the level of the voltage inputted to the non-inverting input terminal with the level of the voltage inputted to the inverting input terminal, and outputting a second error voltage corresponding to a difference between the two levels via an output terminal. In this case, the comparison voltage setting portion may further include a second diode whose cathode is connected to the output terminal of the third OP amplifier and anode is connected to the anode of the first diode.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
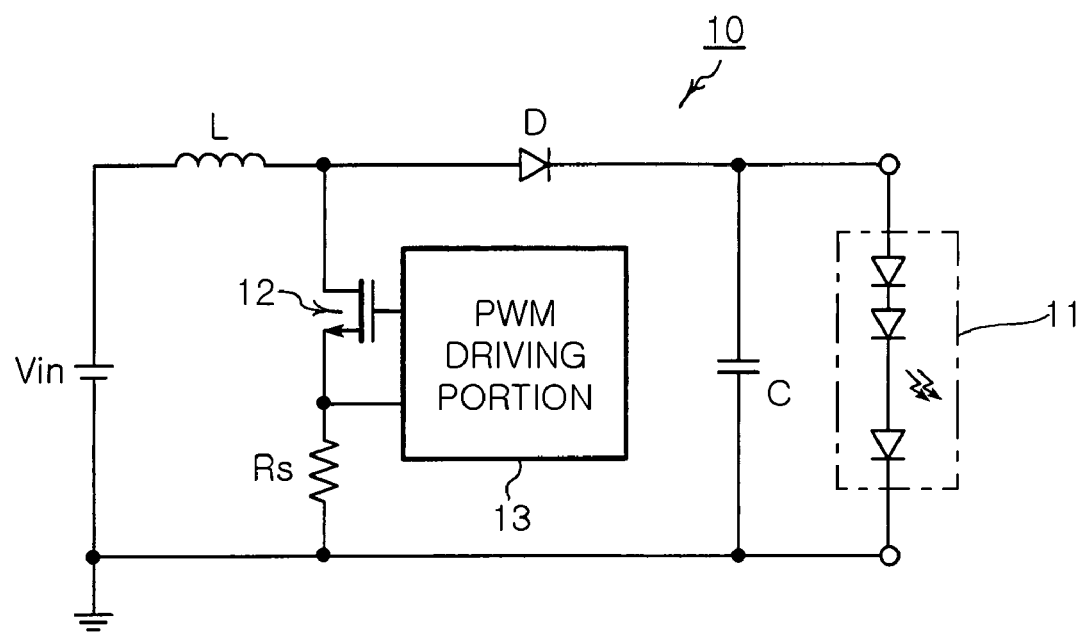
FIG. 1 is a circuit diagram illustrating a conventional LED driving circuit employing a general boost type DC-DC converter.
Figure 2:
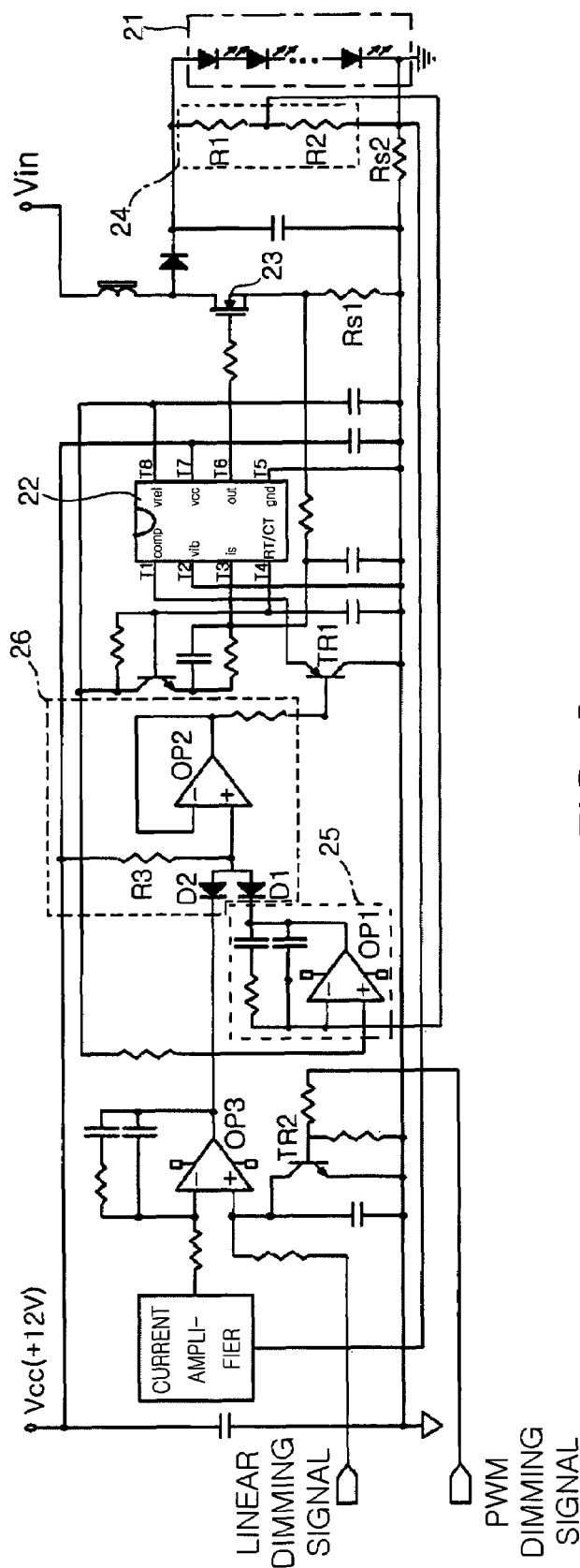
FIG. 2 is a circuit diagram illustrating an LED driving device having functions of overvoltage protection and duty control, according to an exemplary embodiment of the present invention.

FIG. 2 is a circuit diagram illustrating an LED driving device having functions of overvoltage protection and duty control, according to an exemplary embodiment of the present invention. Referring to FIG. 2, the LED driving device includes an LED array 21 including a plurality of LEDs electrically connected to each other; a PWM IC 22 including an RT/CT terminal T4 operated by a power voltage Vcc and generating and outputting a sawtooth wave voltage of a predetermined frequency, a COMP terminal T1 to which a comparison voltage compared with the sawtooth wave voltage is inputted, and an output terminal T6 generating and outputting a pulse signal turned off in a section in which a level of the sawtooth wave voltage is higher than a level of the comparison voltage and turned on in a section in which the level of the sawtooth voltage is lower than the level of the comparison voltage; a switching portion 23 switching and providing an inputted DC voltage Vin to the LED array 21 as a driving voltage, according to the pulse signal outputted from the PWM IC 22; a voltage detector 24 generating a detection voltage corresponding to a both end voltage of the LED array 21; a voltage comparator 25 comparing the detection voltage with a predetermined reference voltage Vref and outputting a first error voltage corresponding to a difference between the detection voltage and the reference voltage; and a comparison voltage setting portion 26 setting up the comparison voltage inputted to the COMP terminal T1 of the PWM IC 22 to be 0V when the error voltage is less than a predetermined level.

The LED array 21 is formed of the plurality of LEDs, and respective LEDs are electrically connected with each other in series, in parallel, or in series/parallel. When used for a light source of an LCD backlight for generating white light, the LED array 21 has a structure in which LEDs emitting light of the same color are electrically connected to each other and a driving device separately driven for each LED array for each color may be included.

Figure 3:
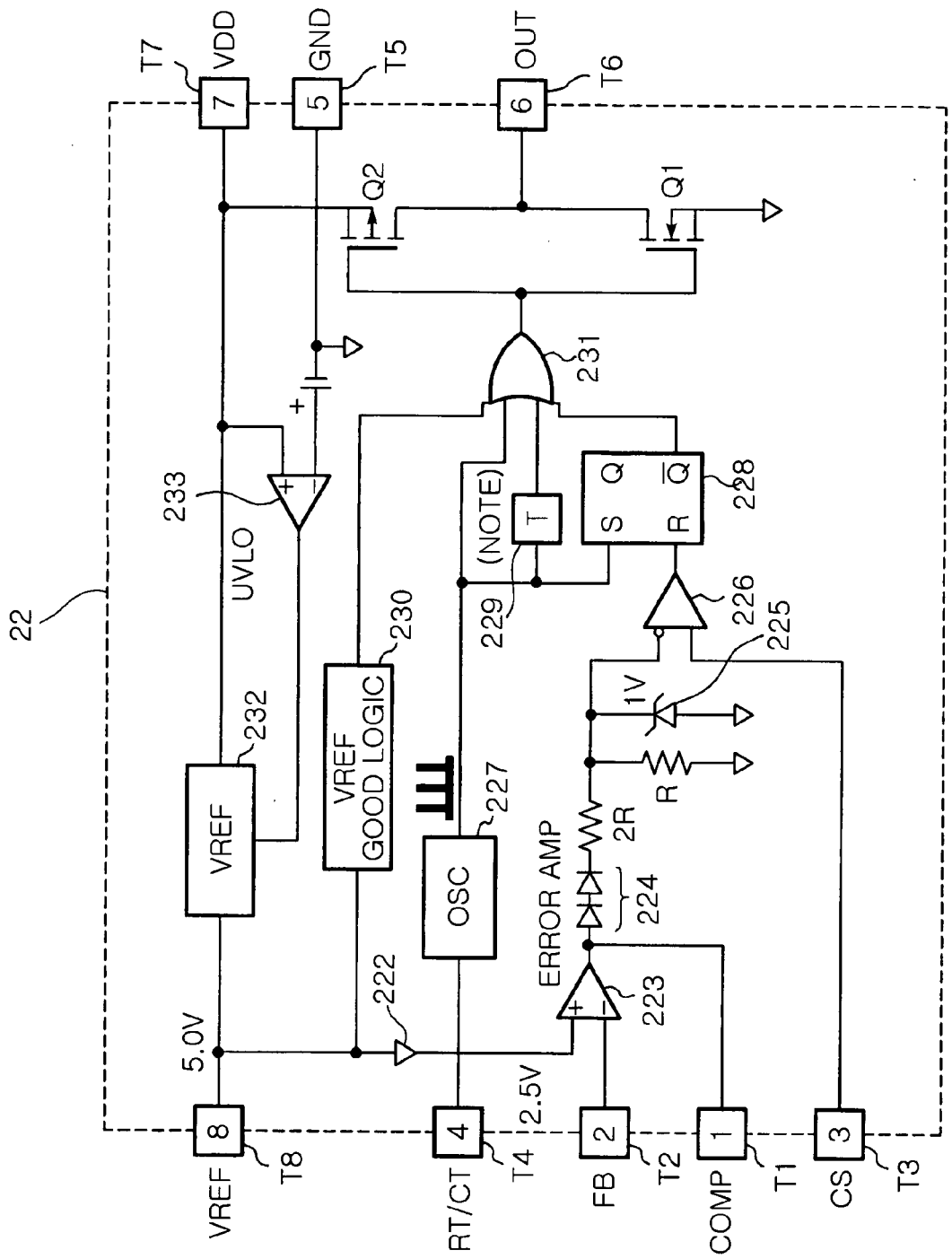
FIG. 3 is an internal circuit diagram of a PWM IC employed by the LED driving device.

The PWM IC 22 may be a general current-mode PWM driving IC. FIG. 3 is a configuration diagram briefly illustrating a general current-mode PWM driving IC employed in the present invention. Referring to FIG. 3, the PWM IC 22 includes an error amplifier 223 comparing a reference voltage Vref with a feedback voltage and calculating a deviation between the reference voltage and the feedback voltage, a comparator 226 comparing an output signal of the error amplifier 223 with a sensing voltage and generating a comparison signal, an oscillator generating a reference clock, logic circuits 228, 229, and 231 comparing the comparison signal with an output signal of the oscillator 227 and determining an on/off section of a switching pulse, transistors Q1 and Q2 operating according to an output signal of the logic circuits 228, 229, and 231 and outputting a predetermined high level voltage 5V in the on section and a predetermined low level voltage 0V, and input/output terminals including a COMP terminal T1 receiving a comparison result, an FB terminal T2 to which the feedback voltage is inputted, a CS terminal T3 receiving the sensing voltage, an RT/CT terminal T4 outputting a sawtooth wave signal as a reference frequency signal, a GND terminal T5 connected to a ground, an OUT terminal T6 outputting the switching pulse whose duty is controlled, a Vcc terminal T7 to which a power voltage is applied, and a Vref terminal T8 to which the reference voltage Vref is applied.

Figure 4:
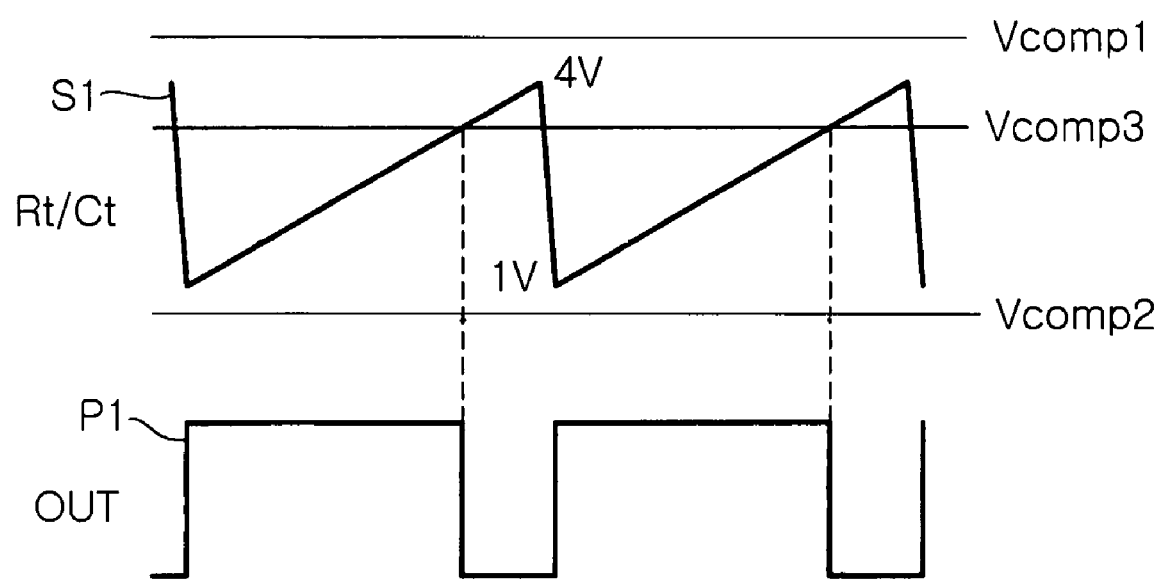
FIG. 4 is a waveform diagram illustrating a sawtooth wave of an RT/CT terminal and an input level of a COMP terminal to describe a method of controlling a duty in the LED driving device.

In the present invention, a duty of an output of the PWM IC 22 becomes 0% according to a sawtooth wave voltage of a predetermined frequency, outputted by the RT/CT terminal T4, and a comparison voltage inputted to the COMP terminal T1. Namely, the PWN IC 22 shown in FIG. 3 includes the RT/CT terminal T4 operated by the power voltage Vcc and generating and outputting the sawtooth wave voltage of the predetermined frequency, the COMP terminal T1 to which the comparison voltage compared with the sawtooth wave voltage is inputted, and the output terminal T6 generating a pulse signal turned on in a section in which the sawtooth wave voltage is lower than a level of the comparison voltage and turned off in a section in which the sawtooth wave voltage is higher than the level of the comparison voltage. FIG. 4 is a waveform diagram illustrating levels of a sawtooth wave of the RT/CT terminal T4 and an input of a COMP terminal T1 to describe a method of controlling a duty of the LED driving device, according to an exemplary embodiment of the present invention.

Referring to FIG. 4, a sawtooth wave voltage S1 of a predetermined frequency outputted from the RT/CT terminal T4 of the PWM IC 22 has a sawtooth waveform having a value of 1 to 4V. The sawtooth wave voltage S1 is compared with a level of comparison voltages Vcomp1 through Vcomp3 inputted to the COMP terminal T1. The PWM IC 22 generates a pulse signal P1 turned off in a section in which the sawtooth wave voltage S1 is higher than the level of the comparison voltages Vcomp1 through Vcomp3 and turned on in a section in which the sawtooth wave voltage S1 is lower than the level of the comparison voltages Vcomp1 through Vcomp3 and outputs the pulse signal P1 to the output terminal T6. Accordingly, when the level of the comparison voltage inputted to the COMP terminal T1 is higher than a least upper bound of the sawtooth wave voltage S1, for example, Vcomp1, the pulse signal P1 outputted to the output terminal T6 has a duty of 100%, always turned on. When the level of the comparison voltage is higher than a greatest lower bound of the sawtooth wave voltage S1, for example, Vcomp2, the pulse signal P1 outputted to the output terminal T6 has a duty of 0%, always turned off. Also, when the level of the comparison voltage exists between the least upper bound and the greatest lower bound of the sawtooth wave voltage S1, for example, Vcomp3, the pulse signal P1 periodically turned on and off is outputted. In the present invention, when an overvoltage is applied or when to turnoff an LED array via a dimming control signal from outside, a level of a voltage applied to the COMP terminal T1 is reduced to be less than 1V, thereby controlling a pulse duty of the output terminal T6 of the PWM IC 22 to be 0%.

The switching portion 23 switches and provides a DC voltage Vin inputted from the outside according to the pulse signal outputted from the output terminal T6 of the PWM IC 22, to the LED array 21 as a driving voltage. As shown in FIG. 2, the switching portion 23 may be an N channel MOSFET whose gate is connected to the output terminal T6 of the PWM IC 22.

The voltage detector 24 generates a detection voltage corresponding to a both end voltage of the LED array 21. As shown in FIG. 2, the voltage detector 24 may be formed of two resistors R1 and R2 mutually connected in series in both ends of the LED array 21 and may output a voltage divided by the two resistors R1 and R2 as the detection voltage.

The voltage comparator 25 compares the detection voltage with a predetermined reference voltage and a difference between the detection voltage and the reference voltage. The voltage comparator 25 may include a first OP amplifier OP1 receiving the detection voltage via an inverting input terminal, receiving the reference voltage via a non-inverting input terminal, and outputting an error voltage corresponding to a difference between the inverting input terminal and the non-inverting input terminal. The first OP amplifier OP1 operates as an error amplifier.

When the error voltage outputted from the first OP amplifier OP1 is less than a predetermined level, the comparison voltage setting portion 26 sets up the comparison voltage inputted to the COMP terminal T1 of the PWM IC 22. In detail, the comparison voltage setting portion 26 may include: a first diode D1 whose cathode is connected to an output terminal of the first OP amplifier OP1; a resistor R3 whose one terminal is connected to the power voltage Vcc and another terminal is connected to an anode of the first diode; a second OP amplifier OP2, whose non-inverting input terminal is connected to the anode of the first diode D1 and electrically connected to an output terminal, having an output whose level is identical with an input voltage of the non-inverting input terminal; and a PNP transistor TR1 whose base is connected to the output terminal of the second OP amplifier OP2, emitter is connected to the COMP terminal T1 of the PWM IC 22, and collector is connected to a ground.

In addition to the described configuration, the LED driving device may further include a third OP amplifier OP3 receiving a voltage whose level corresponds to one of a linear dimming signal DS1 and a PWM dimming signal DS2 inputted from outside via a non-inverting input terminal, receiving a voltage whose level corresponds to a current outputted from a cathode terminal of the LED array 21 via an inverting input terminal, comparing the level of the voltage inputted to the non-inverting input terminal with the level of the voltage inputted to the inverting input terminal, and outputting a second error voltage corresponding to a difference between the two levels via an output terminal. In this case, the comparison voltage setting portion 26 may further include a second diode D2 whose cathode is connected to the output terminal of the third OP amplifier OP3 and anode is connected to the anode of the first diode D1.

Hereinafter, the operations and effects of the present invention will be described in detail referring to FIG. 2.

An exemplary embodiment of the present invention provides functions of overvoltage protection capable of protecting a circuit from an overvoltage when the overvoltage is applied to an LED array used for a load and duty control capable of controlling a duty of a PWM IC to perfectly cutoff a current supplied to the LED array by a dimming control signal inputted from outside.

The operations for the overvoltage protection will be described. In the present invention, a boost type DC-DC converter is employed. Since an overvoltage may be applied when a load is open in the boost type DC-DC converter, an overvoltage protection circuit is employed to protect a circuit from the overvoltage. In the present invention, when a load is open, for example, cutoff of connection between LEDs included in the LED array 21 is generated, a detection voltage corresponding to a both end voltage of the LED array 21 is detected by the voltage detector 24 to protect the LED array 21 from applying an overvoltage. As shown in FIG. 2, the detection voltage may be a voltage divided according to a resistance value of voltage dividing resistors R1 and R2 connected in series.

The detection voltage is inputted to an inverting input terminal of the first OP amplifier OP1 and compared with a reference voltage inputted to a non-inverting input terminal of the first OP amplifier OP1, and a value corresponding to a difference between the detection voltage and the reference voltage is outputted. When an overvoltage is inputted, an output level of the first OP amplifier OP1 decreases to approximately 0V and a current flows from the power voltage Vcc via the first diode D, thereby lowering a level of a voltage applied to a non-inverting input terminal of the second OP amplifier OP2 in the comparison voltage setting portion 26. In this case, the second OP amplifier OP2 operates as an impedance conversion circuit whose inverting input terminal and output terminal are electrically connected to each other and gain is 1, amplifying a current and operating as a buffer.

Accordingly, a voltage level of the output terminal of the second OP amplifier OP2 is identical with an input voltage of a non-inverting input terminal.

Namely, when an overvoltage is applied to the LED array 21, the output level of the first OP amplifier OP1 decreases approximately 0V and the current flows into the power voltage Vcc, thereby lowering not only the level of the voltage applied to the non-inverting input terminal of the second OP amplifier OP2 also the level of the output terminal of the second OP amplifier OP2. Accordingly, as a voltage level of a base terminal of the PNP transistor TR1 connected to the output terminal of the second OP amplifier OP2 decreases, the PNP transistor TR1 is turned on and a voltage of the COMP terminal T1 of the PWM IC 22, connected to the emitter, becomes substantially 0V. Therefore, a duty of a pulse of the output terminal T6 of the PWM IC 22 becomes 0% and a current supplied to the LED array 21 is cut off.

Hereinafter, the operations of controlling a duty of the PWM IC 22 to perfectly cut off a current supplied to the LED array 21 according to a dimming control signal inputted from outside will be described.

Similar to the operations of the overvoltage protection, to perfectly cut off the current supplied to the LED array 21 according to external dimming control signals DS1 and DS2, a voltage of the base of the PNP transistor TR1 is lowered while turned on, thereby lowering a level of a voltage of the COMP terminal T1 of the PWM IC 22 to be less than a greatest lower bound of a sawtooth wave voltage of the RT/CT terminal T4.

On the other hand, a voltage having a level corresponding to the dimming control signals DS1 and DS2 and a voltage having a level corresponding to a current outputted from a cathode terminal of the LED array 21 are inputted to a non-inverting input terminal and an inverting input terminal of the third OP amplifier OP3, respectively, and compared with each other. The linear dimming control signal DS1 is inputted to a non-inverting input terminal of the third OP amplifier OP3 in series from outside and a level of a signal generated by detecting and amplifying the current flowing through the cathode of the LED array 21 is inputted to the non-inverting input terminal of the third OP amplifier OP3, thereby comparing the linear dimming control signal DS1 with the signal. When the linear dimming control signal DS1 decreases, an output level of the third OP amplifier OP3 decreases. Also, a value of the PWM dimming control signal DS2 in the form of a pulse is converted via an NPN transistor TR2 and applied to the non-inverting input terminal. When a duty of the PWM dimming control signal DS2 decreases, an output level of the OP amplifier OP3 also decreases.

Accordingly, similar to the operations of the overvoltage protection circuit, a current flows from the power voltage Vcc via the second diode D2, thereby lowering not only the level of a voltage applied to the non-inverting input terminal of the second OP amplifier OP2 operating as a buffer also a level of the output terminal of the second OP amplifier OP2. Accordingly, as the voltage level of the base terminal of the PNP transistor TR1 connected to the output terminal of the second OP amplifier OP2 decreases, the PNP transistor TR1 is turned on and the voltage of the COMP terminal T1 of the PWM IC 22, connected to the emitter, becomes substantially 0V. Therefore, the duty of the pulse of the output terminal T6 of the PWM IC 22 becomes 0% and the current supplied to the LED array 21 is cut off.

In the circuit according to an exemplary embodiment of the present invention, the outputs of the first OP amplifier OP1 and the third OP amplifier OP3 are the non-inverting input terminal of the second OP amplifier OP2 via the first diode D1 and the second diode D2, respectively. In this case, since a drop of a diode voltage is generated by the first diode D1 and the second diode D2, an impedance is increased by interposing a resistance R3 having a large value between the non-inverting input terminal of the second OP amplifier OP2 and the power voltage Vcc and a current flowing through the resistor R3 is amplified by the second OP amplifier OP2 that is an impedance conversion circuit.

Accordingly, a low voltage identical with an amount of the voltage drop of the first diode D1 and the second diode D2 is applied to the base of the PNP transistor TR1 and the current amplified by the second OP amplifier OP2 is supplied to the base of the PNP transistor TR1, thereby making the PNP transistor TR1 conductive. Due to this, the voltage of the COMP terminal T1 of the PWM IC 22 becomes 0V substantially, the duty of the pulse of the output terminal T6 of the PWM IC 22 becomes 0%, and the current supplied to the LED array 21 is cut off.

In addition, since a low current flows to the output terminals of the first OP amplifier OP1 and the third OP amplifier OP3 via the resistor R3, quick dimming variation according to the external dimming control signal may be possible by making a response speed of the first OP amplifier OP1 and the third OP amplifier OP3 and the driving circuit may be safely protected by quickly operating the overvoltage protection circuit.

As described above, according to an exemplary embodiment of the present invention, a driving circuit may be safely protected from an overvoltage applied to an LED array. In addition, when to turn off the LED array via an external dimming control signal, a duty of an output signal of a PWM IC is outputted perfectly 0% to slightly turn on a light, thereby preventing power consumption.

While the present invention has been shown and described in connection with the exemplary embodiments, it will be apparent to those skilled in the art that modifications and variations can be made without departing from the spirit and scope of the invention as defined by the appended claims.

What is claimed is:

1. A light emitting diode driving device comprising:
    an LED array comprising a plurality of light emitting diodes electrically connected to each other;
    a pulse width modulation IC comprising an RT/CT terminal operated by a power voltage and generating and outputting a sawtooth wave voltage of a predetermined frequency, a COMP terminal to which a comparison voltage compared with the sawtooth wave voltage is inputted, and an output terminal generating and outputting a pulse signal turned off in a section in which a level of the sawtooth wave voltage is higher than a level of the comparison voltage and turned on in a section in which the level of the sawtooth voltage is lower than the level of the comparison voltage;
    a switching portion switching and providing an inputted DC voltage to the light emitting diode array as a driving voltage, according to the pulse signal outputted from the pulse with modulation IC;
    a voltage detector generating a detection voltage corresponding to a both end voltage of the light emitting diode array;
    a voltage comparator comparing the detection voltage with a predetermined reference voltage and outputting a first error voltage corresponding to a difference between the detection voltage and the reference voltage; and
    a comparison voltage setting portion setting up the comparison voltage inputted to the COMP terminal of the pulse with modulation IC to be 0V when the error voltage is less than a predetermined level.

2. The light emitting diode driving device of claim 1, wherein the voltage comparator comprises a first OP amplifier receiving the detection voltage via an inverting input terminal, receiving the reference voltage via a non-inverting input terminal, and outputting the first error voltage corresponding to the difference between the inverting input terminal and the non-inverting input terminal.

3. The light emitting diode driving device of claim 2, wherein the comparison voltage setting portion comprises:
   a first diode whose cathode is connected to an output terminal of the first OP amplifier;
   a resistor whose one terminal is connected to the power voltage and another terminal is connected to an anode of the first diode;
   a second OP amplifier, whose non-inverting input terminal is connected to the anode of the first diode and electrically connected to an output terminal, having an output whose level is identical with an input voltage of the non-inverting input terminal; and
   a PNP transistor whose base is connected to the output terminal of the second OP amplifier, emitter is connected to the COMP terminal of the pulse with modulation IC, and collector is connected to a ground.

4. The light emitting diode driving device of claim 3, further comprising a third OP amplifier receiving a voltage whose level corresponds to one of a linear dimming signal and a pulse with modulation dimming signal from outside, via a non-inverting input terminal, receiving a voltage whose level corresponds to a current outputted from a cathode terminal of the light emitting diode array via an inverting input terminal, comparing the level of the voltage inputted to the non-inverting input terminal with the level of the voltage inputted to the inverting input terminal, and outputting a second error voltage corresponding to a difference between the two levels via an output terminal,
   wherein the comparison voltage setting portion further comprises a second diode whose cathode is connected to the output terminal of the third OP amplifier and anode is connected to the anode of the first diode.

* * * * *